D. S. WAGENER.
Flouring Mill.
No. 1,136. Reissued Feb. 5, 1861.
Fig. 1
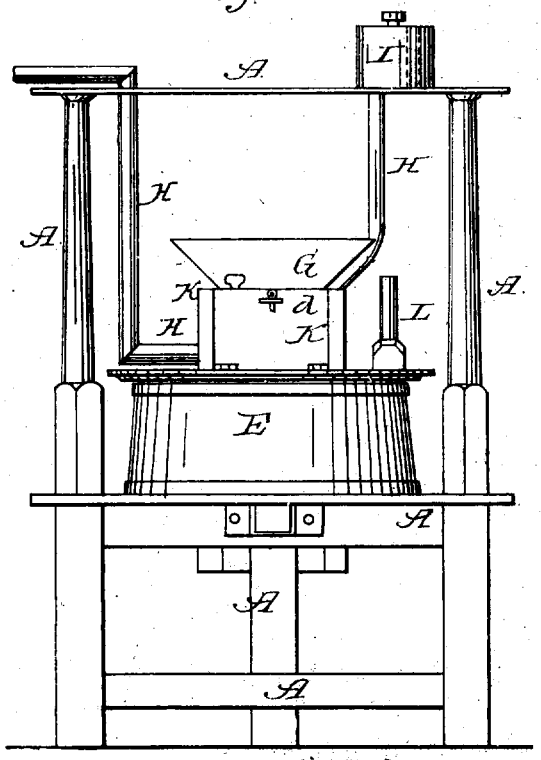
Fig. 2
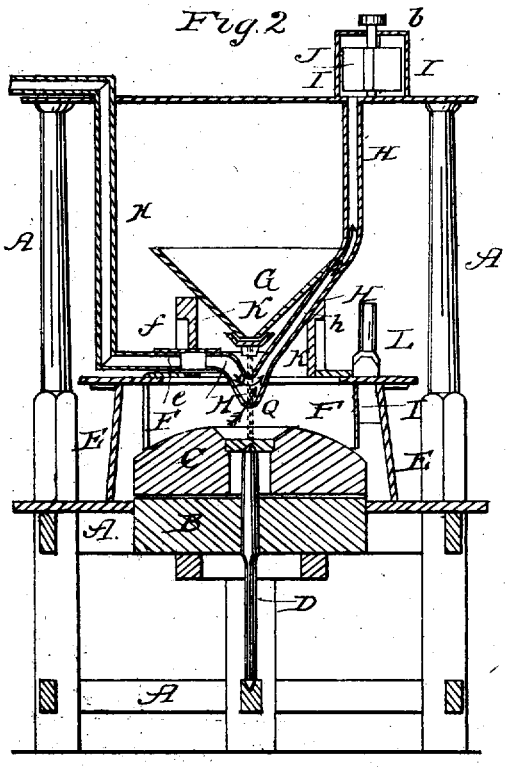
Fig. 4
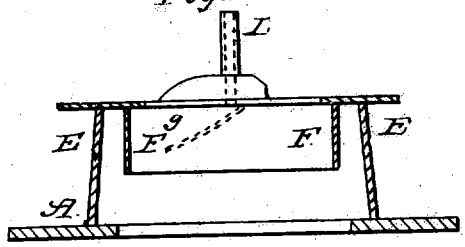
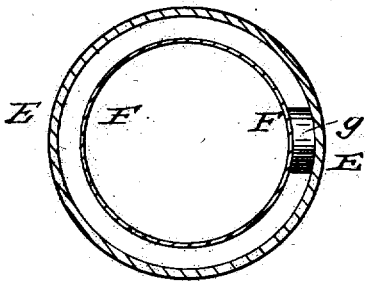
WITNESSES
S. Cohen
J. Heisch
INVENTOR
D. S. Wagener
N. PETERS, Photo-Lithographer, Washington, D. C.

UNITED STATES PATENT OFFICE.

DAVID S. WAGENER, OF PENN YAN, NEW YORK.

IMPROVEMENT IN FLOURING-MILLS.

Specification forming part of Letters Patent No. 13,610, dated September 25, 1855; Reissue No. 930, dated March 13, 1860; Reissue No. 1,136, dated February 5, 1861.

*To all whom it may concern:*

Be it known that I, DAVID S. WAGENER, of Penn Yan, in the county of Yates and State of New York, have invented certain new and useful Improvements in Flouring-Mills; and I do hereby declare the following to be a full, clear, and exact description of the same, reference being had to the accompanying drawings, making a part of specification, in which—

Figure 1 represents an elevation of the mill. Fig. 2 represents a vertical section through the same. Fig. 3 represents a horizontal section through the case that covers the runner and the air-chamber within it. Fig. 4 represents a vertical section through the case and inclosed air-chamber.

Similar letters of reference, where they occur in the separate figures, denote like parts in all the drawings.

It is found that wheat and other grains which are ground into flour, however much they may be cleaned by such machines as are used for the purpose, still contain much dust and many impurities that are detrimental to the ground flour, when allowed to mingle and be ground with it, and which cannot be afterward bolted out, such impurities being as minute in their ground state as the meal itself, and will consequently as readily pass the bolting-cloth. Plans have been devised for cleaning the grains while they are being fed toward the grinding-stones, and a blast has been suggested in connection with certain feeding-tubes through which the grain falls, such blast to be forced from the fan-blower through the grains. I have found that a forced blast of this kind will not answer, as it tends to scatter or blow off the impurities, when they should be concentrated or drawn toward a common point to remove them from the grain without drawing them into other parts of the mill. With a suction-draft particles of matter of a certain specific gravity may be removed with the same certainty that they could be weighed by scales, the blast being the vehicle by which they are conveyed, as well as weighed and separated from the grains. By a forced or driven blast every crack or crevice detracts from its volume or force, and every open avenue that varies in area by the material passing through it so affects the uniformity of the driven blast as to make it uncertain in its operation; but the driven blast spreads and scatters from the moment it leaves the fan-blower, and instead of confining itself to the tube actually finds its way, loaded with the dust it collects, down through, into, and between the burrs or stones with the grains, and is there inseparably mixed with the flour.

My invention consists in feeding the grain past or through a suction-draft that is interposed between the hopper and the grinding parts of the stones, for the purpose of removing from the grain such dust and other impurities as may not have been separated from it, and which would otherwise be ground up with it.

To enable others skilled in the art to make and use my invention, I will proceed to describe the same with reference to the drawings.

A represents a substantial frame in which are mounted the bed-stone B, and runner C the latter being hung and driven by a spindle, D, in any of the usual well-known ways.

E is a curb or case for covering the runner C, and within this case there is a second curb or case, F, which comes down as far as the upper side of the runner, and in close proximity thereto. This inner curb contains within itself what I term an "air-chamber," that protects the eye of the burr or runner from the heated air that escapes at the skirts of the burrs or stones and accumulates in the space between the inner and outer cases, F E, and from whence it is removed by artificial means that will be hereinafter described.

G is the hopper, from whence the grain falls into a shoe, *a*, that conducts it over the eye of the upper stone, and, as ordinarily used, drops the grain immediately into the eye of the stone; but here, between the hopper or shoe and the grinding-surfaces of the stones, I introduce my contrivance for taking out all and any dust or other impurities that may be in the grain. It may be constructed and used substantially as follows:

H is a tube leading from any convenient point where clean air may be found, and connected with a fan-case, I, in which a fan, J, is rapidly revolved by any known appliance, but so that it will draw a current of air toward itself through the tube H. The fan-case has a proper opening, *b*, in it, through which the blast or current drawn into itself is forced out, and this opening *b* may terminate outside of the building, so as to carry off and out of the mill the dust gathered in by the fan J. The pipe or tube H, immediately under the shoe *a*, or immediately over the eye of the upper millstone, may be curved downward, and be so opened (as at *c*) as that the grain falling from the shoe shall pass through, across, or in contact with the blast or current of air that is moving toward the fan-case through said pipe H.

When grain is fed into the eye of a millstone from a shoe, it is in its best possible condition to be cleansed of any and all impurities remaining in it, because it is dribbled out into the thinnest possible column and is shaken down with the nicest uniformity, so that a blast may be regulated to pass through it that will weigh and remove from it everything of less specific gravity than the wheat itself, or whatever is to be ground in the mill. Here, then, in the most available point, I apply my separating suction-blast.

It is obvious that a forced blast from the fan through the tube H would not answer, because it would blow the dust with the grains through the opening 2, into the eye of the stone; but by a suction-blast air, on the contrary, will enter the opening 2 into the tube, and pass out through the fan-case. It must, for this reason, if there were no others, be a suction-blast. The hopper G, at its lower extremity, as well as the shoe *a*, may be incased in a box or close chamber, K, to which access may be had through a door, *d*, and as this chamber connects with that inclosed within the curb F, the suction-fan may draw the confined air in these chambers through the openings at *c* and 2, and force it out at *b*, where the other impurities are carried off. I have shown the tube H as extended some distance beyond where the grain drops into the eye of the runner, for the purpose of receiving air that is free from dust; but if the air of the room in which the mill stands is sufficient for the purpose the tube at *e* may be slipped out of the sleeve *f*, and the air taken in at that point. To accomplish the desired object, it is necessary that a current of air drawn toward a fan should pass in close proximity or across the line in which the grain drops or falls from the hopper on its way to the grinding-surfaces of the stones, and so that this current is carried past that point. It is immaterial where the air comes from to supply the place of that forced out of the fan-case by the fan. It will flow in from every open joint or crevice, and it will take up and carry with it all the dust that comes within its path and concentrate it at one point, and from this point it is carried off by a direct blast.

For the purpose of ventilating the chamber inclosed between the curbs E and F, I arrange a directing-board, *g*, which inclines upward from near the bottom of the curb F, and connects with a pipe, L, through which the air in said chamber, which becomes surcharged and heavy with the moisture or "sweating" of the grain or meal, may be driven off, it being set in motion by the motion of the runner, but which, without this or some other means of being forced off would be detrimental to the production of good flour or interfere with the grinding. I thus prevent the dust from entering into the eye of the stone at all points, and, moreover, carry a suction-draft from the feeding-point, which becomes a vehicle for conveying to a certain point all the dust that comes within its avenues.

Having thus fully described the nature and object of my invention, what I claim therein as new, and desire to secure by Letters Patent, is—

In combination with a grinding-mill, the feeding of the grain through or past a suction-draft interposed between the hopper and the grinding-surfaces of the stones, for the purpose of removing from the grain the dust and other impurities in it, substantially as herein described.

D. S. WAGENER.

Witnesses:
A. B. STOUGHTON,
E. COHEN.